United States Patent [19]
White

[11] 3,779,531
[45] Dec. 18, 1973

[54] TOP DRIVEN MATERIAL SHEARING MIXER AND AERATOR

[76] Inventor: Robert W. White, 409 S. Union Ave., P.O. Box 74, Salem, Ohio 44460

[22] Filed: Aug. 21, 1970

[21] Appl. No.: 65,969

Related U.S. Application Data

[63] Continuation-in-part of Ser. No. 851,702, Aug. 20, 1969.

[52] U.S. Cl. ................. 261/87, 261/93, 261/120, 259/5, 210/219
[51] Int. Cl. ........................ B01f 3/04, B01f 7/32
[58] Field of Search .............. 261/30, 87, 91, 93, 261/120; 259/5; 210/219, 242

[56] References Cited
UNITED STATES PATENTS

| | | | |
|---|---|---|---|
| 2,612,358 | 9/1952 | Daman | 261/93 |
| 3,491,880 | 1/1970 | Reck | 261/87 |
| 2,767,965 | 10/1956 | Daman | 261/93 |
| 2,343,274 | 3/1944 | Bailey, Jr. et al. | 261/93 |
| 3,400,918 | 9/1968 | MacLaren | 261/87 |
| 3,189,334 | 6/1965 | Bell | 261/93 |
| 2,928,661 | 3/1968 | MacLaren | 261/93 |
| 2,390,111 | 12/1945 | Logue | 261/93 |
| 2,590,581 | 3/1952 | Shirley | 261/93 |
| 2,863,681 | 12/1958 | Robbins | 277/34 |
| 2,324,018 | 7/1943 | Peterson | 261/93 |
| 2,780,360 | 2/1957 | Bon et al. | 210/219 |

Primary Examiner—Tim R. Miles
Assistant Examiner—Steven H. Markowitz
Attorney—Clarence A. O'Brien and Harvey B. Jacobson

[57] ABSTRACT

A portable unit supported in or on a body of fluent material activates a shear zone within the material into which a treating medium is injected under pressure. The shear zone is activated by counter-rotating rotors having projections through which the treating medium is discharged. The rotors are driven from a support by concentric shafts enclosing flow passages conducting the treating medium to the rotors.

15 Claims, 6 Drawing Figures

Robert W. White

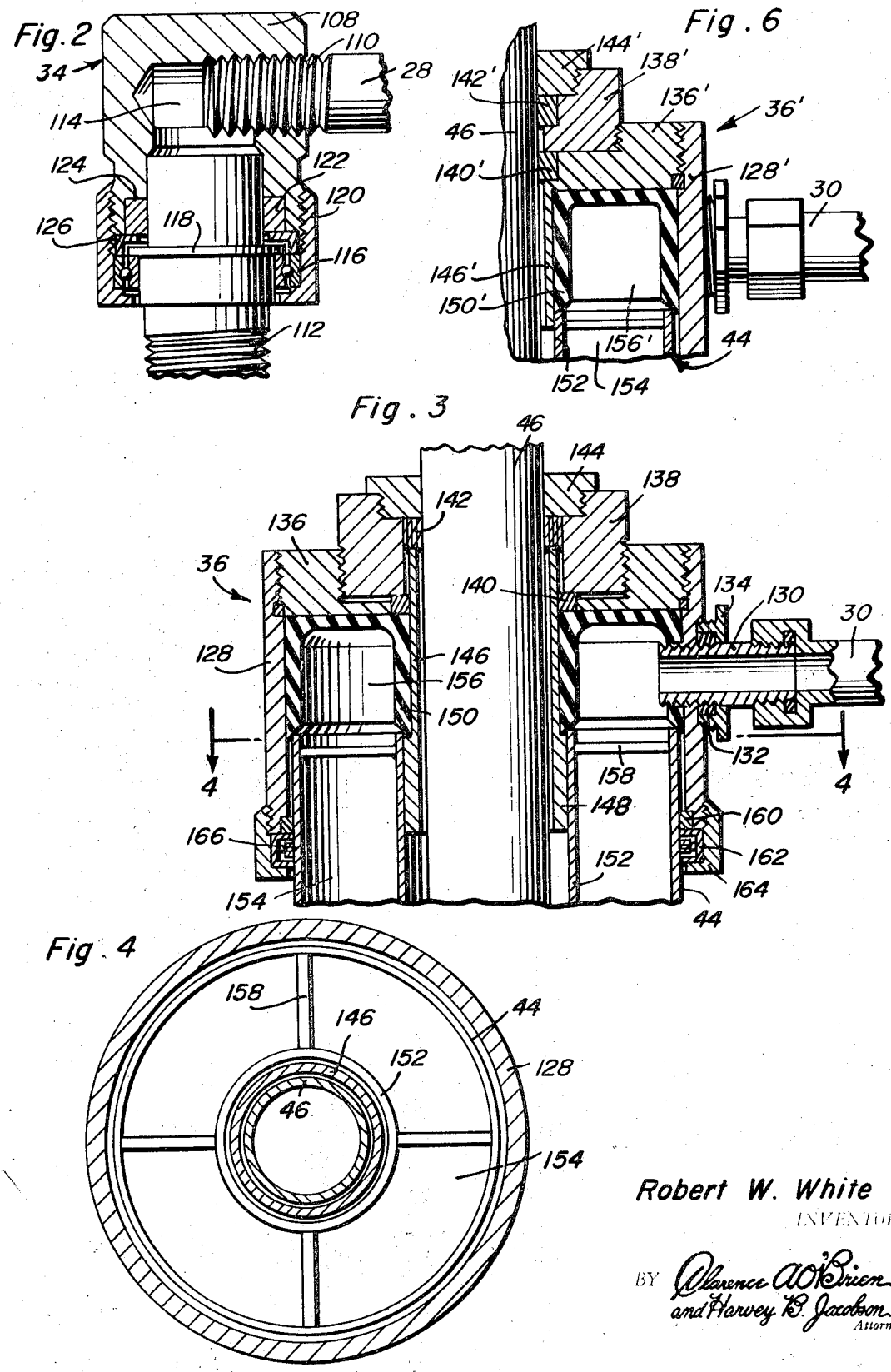

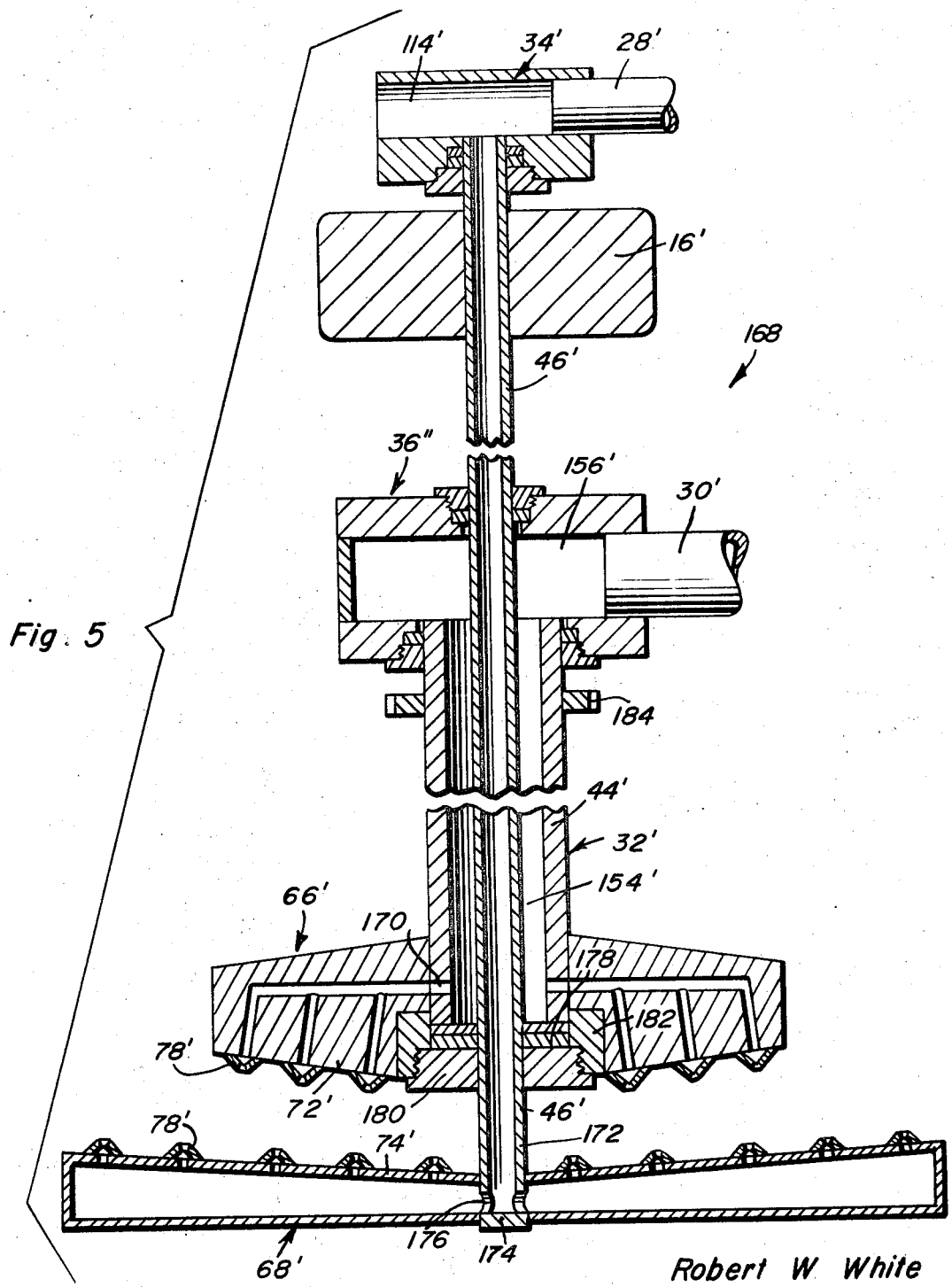

3,779,531

TOP DRIVEN MATERIAL SHEARING MIXER AND AERATOR

This application is a continuation-in-part of my prior co-pending application U. S. Ser. No. 851,702, filed Aug. 20, 1969 and relates to the treatment of waste materials.

There is presently a need for control of pollution in rivers, streams, lakes, harbors and the shores of the ocean resulting from such sources as sewage treatment plants, chimney wastes, pulp mills, mine drainage, oil spillage and other sources of industrial wastes. Waste materials from the foregoing sources may be treated in accordance with the method as disclosed and claimed in my prior co-pending application aforementioned. However, in view of the wide variety of uses for this treating method and the many diverse areas or locations where treatment is required, a mobile or portable type of treating apparatus would be most desirable in connection with any extensive anti-pollution program.

In accordance with the present invention, a portable treating apparatus for filling the aforementioned need is provided, one embodiment of which features a floating support carrying the powering equipment and pressurized fluid source or supply conduit equipment on top. A concentric shaft assembly extending downwardly from the floating support into the material being treated, mounts counter-rotating rotors at the lower end having confronting faces with shear projection clusters mounted thereon as disclosed in my prior co-pending application for the purpose of establishing an active shear zone when the rotors are powered. A treating medium such as gas, liquid or finally divided solids or mixtures thereof, is injected into the shear zone through orifices in the projection clusters which are in fluid communication through the rotor bodies with flow passages in the concentric shaft assembly conducting the treating medium from a pressurized source located on top of the floating support.

The present invention also contemplates the mounting of the portable apparatus by means of its support in an inverted position within a chimney stack for example, in order to treat flue gas and other airborne exhausts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged partial sectional view of a portion of the apparatus shown in FIG. 1.

FIG. 3 is an enlarged partial sectional view of a sealing unit in the apparatus shown in FIG. 1.

FIG. 4 is a transverse sectional view taken substantially through a plane indicated by section line 4—4 in FIG. 2.

FIG. 5 is a somewhat diagrammatic vertical sectional view through another form of treating apparatus constructed in accordance with the present invention.

FIG. 6 is a partial sectional view illustrating an alternate form of sealing unit.

Figure 1:
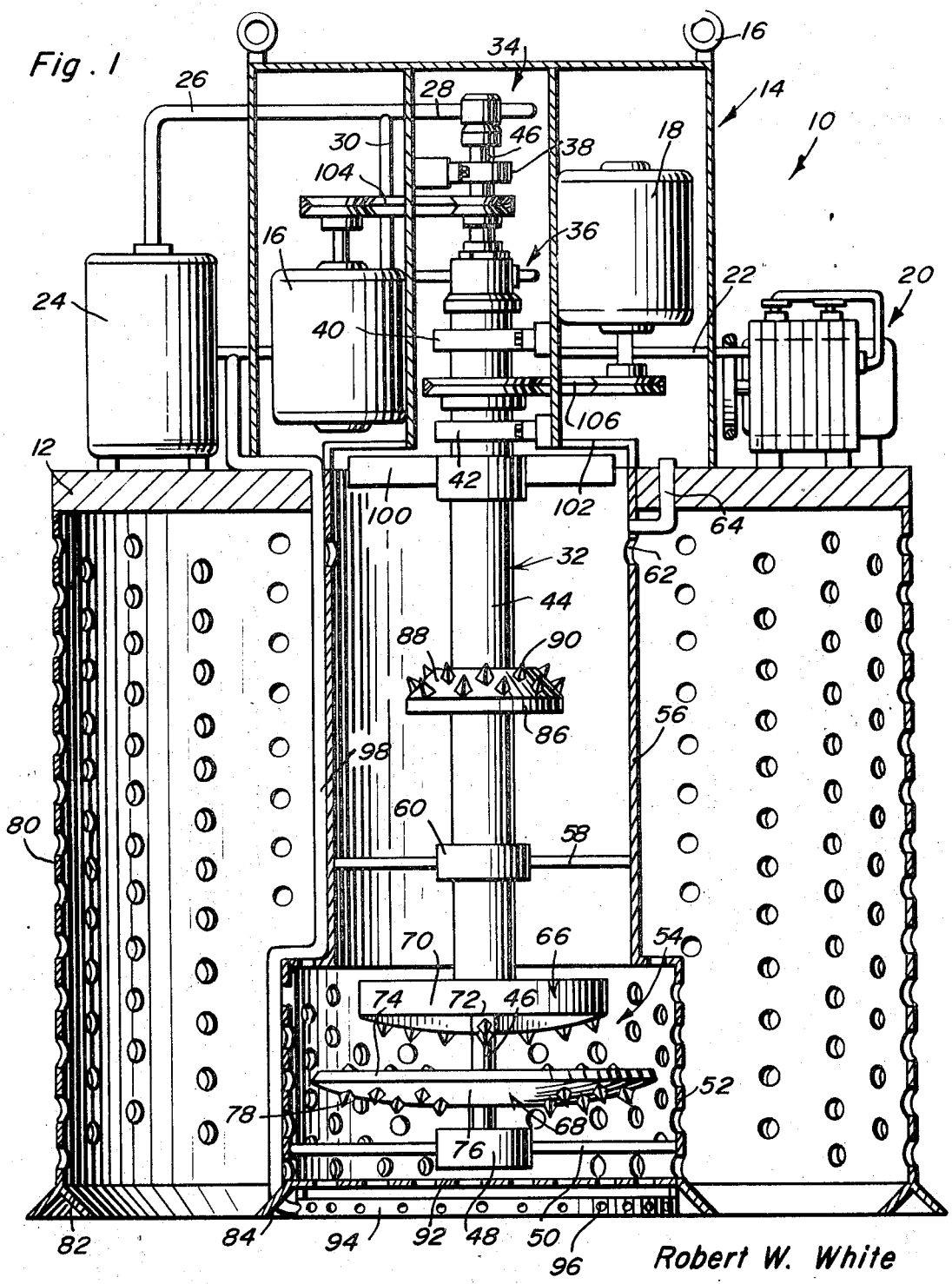
FIG. 1 is a side sectional view through a typical apparatus constructed in accordance with the present invention with parts shown in vertical elevation.

Referring now to the drawings in detail, and initially to FIG. 1, treating apparatus generally referred to by reference numeral 10 is shown. The apparatus includes a support platform 12 which is shown somewhat diagrammatically and adapted to provide a floating support for the entire apparatus on the material to be treated, which may for example be a body of polluted water in a lake, pond, river, etc., or sewage in a treating pond. Thus, the support platform 12 may enclose hollow ballast tanks or be made of a flotation material such as styrofoam plastic.

A mounting frame assembly 14 may be secured to the top of the floating platform 12 and provided with lift rings 16 on top thereof to facilitate transport of the apparatus from place to place. The mounting frame provides support on top of the floating platform 12 for a pair of prime movers in the form of drive motors 16 and 18. In one form of the invention the supporting platform 12 also mounts an air compressor assembly 20 connected by means of a conduit 22 to a pressure storage tank 24 which is thereby charged with compressed air which is fed by a supply line 26 and branch lines 28 and 30 to the upper end of a vertical shaft assembly 32 through a pair of special, high pressure sealing units 34 and 36 designed to prevent leakage of expensive gases such as ozone. The shaft assembly is supported on the mounting frame assembly 14 by means of pillow block bearing assemblies 38, 40 and 42 secured to the mounting frame assembly above the support platform 12.

The shaft assembly 32 includes an outer shaft 44 that is rotatably supported by the pillow block journal assemblies 40 and 42 adjacent the upper end which extends into the sealing unit 36, which is unique in that it is easily disassembled for replacement of parts as hereinafter described in detail. An inner shaft 46 extends through the outer shaft in concentric relation thereto and is rotatably supported by the bearing assembly 38 adjacent its upper end which extends into the sealing unit 34. The lower end of the inner shaft 46 is rotatably supported by a bearing assembly 48 supported by radial spokes 50 that extend inwardly from a foraminous or perforated cylindrical baffle housing 52 enclosing rotor assembly 54. The housing 52 is suspended from the lower end of a diametrically smaller and imperforate tube 56 which is secured to and depends from the support platform 12 to direct downflow of influent in concentric relation to the shaft assembly 32. Supporting rods or spokes 58 position an intermediate bearing assembly 60 which rotatably supports the outer shaft 44 in its concentric position within the tube 56. The tube is provided with circumferentially spaced recirculating ports 62 adjacent the upper end and is also provided with an injection tube 64 through which additional treating medium may be introduced to the tube for mixing with air and the material being treated.

The rotor assembly includes an upper flow dispersing rotor or impeller 66 having vanes as disclosed in my prior copending application except for a small pitch to axially impel material downwardly. The impeller 66 is secured to the lower end of the outer shaft 44 and a lower flow directing rotor or impeller 68 is secured adjacent to the lower end of the inner shaft 46 in vertically spaced relation to the upper rotor 66 so as to establish a shear zone 70 between the confronting faces 72 and 74 of the rotors as described in my prior co-pending application aforementioned. Thus, the confronting convex face 72 of the rotor 66 and concave face 74 of the rotor 68 as well as the lower curved face 76 of the rotor 68 are provided with clusters of studs 78 radially spaced from the rotational axis of the impeller having orifice ports through which the treating medium is discharged and distributed within the shear zone as described in detail in my prior co-pending application aforementioned. When the rotors 66 and 68 are rotated in opposite directions, the shear zone 70 will be activated in order to enhance the action of the treating medium introduced into the material being treated, some of which is displaced radially outwardly and baffled by the foraminous housing 52 through which the mixture of treated material and treating medium flows. Some of the mixture may also flow upwardly outside of the imperforate influent tube 56 and enter through the recirculating ports 62. The diffusion and baffling of the mixture flowing radially outward may also be effected by means of an outer perforated cylindrical wall 80 which is secured to and depends from the support platform 12.

An annular support 82 is secured to the lower edge of the outer cylindrical wall 80 while an annular support foot 84 is secured to the lower edge of the cylindrical housing 52 enclosing the rotor assembly 54 and the shear zone 70 established between the upper and lower rotors. A flow disperser rotor 86 may also be secured to the outer shaft 44 of the shaft assembly and provided on its upper beveled face 88 with shearing studs 90 through which treating medium is discharged as disclosed in my prior copending application aforementioned. A screen 92 may be secured to the bottom of the housing 52 in order to enclose the rotor assembly and the bearing 48 and protect these parts from larger solids that may have settled within the body of fluent material being treated. Further, in order to stir up settled material, a circular air manifold 94 may be mounted below the screen 92 and provided with outlet apertures 96 through which air under pressure is discharged in a horizontal plane. A supply conduit 98 is therefore connected between the manifold 94 and the outlet conduit 22 supplying air under pressure from the air compressor 20 to the storage tank 24.

As clearly shown in FIG. 1, the upper rotor 66 is diametrically equal to or less than the inside diameter tube 56 to insure that all of the influent exiting from the lower end of tube 56 contacts the lower rotor 68. The lower rotor 68 on the other hand extends radially beyond the upper rotor within the housing 52 which is diametrically larger than the influent tubes 56 so that excessive turbulence will occur outside of the tube 56. The material being treated will be activated within the shear zone 70 within which it is mixed with air and other treating media that may be introduced through the tube 64. A downwardly pitched turbine blade 100 is secured to the outer shaft 44 partially submerged within the material being treated and covered by a baffle plate structure 102 in order to entrain air into the influent for partial aeration.

As hereinbefore indicated, the rotors 66 and 68 are rotated in opposite directions. To this end, the drive motor 16 is drivingly connected through a belt drive 104 to the inner shaft 46 from an upwardly extending motor shaft whereas the downwardly extending motor shaft of the drive motor 18 is drivingly connected to the outer shaft 44 through a belt drive 106. It will also be noted that the motor drive and sealing units 34 and 36 are located above the supporting platform 12 in order to facilitate servicing of the apparatus as well as to avoid the necessity for protective enclosure that would be necessary if the top mounted equipment were to be submerged within the material being treated. The sealing units 34 and 36 must of course accommodate the supply of treating medium under pressure where it be the compressed air as shown in the illustrated embodiment or any other treating medium supplied to the counter-rotating drive shaft assembly 32.

As shown in FIG. 2, the sealing unit 34 includes a body 108 which is adapted to be fixed to the mounting frame and threadedly connected to the inlet end 110 of the supply conduit branch 28. The inner shaft 46 of the shaft assembly 32 is adapted to be threadedly connected to an upper shaft section 112 that extends into the body 108 for fluid communication with a receiving chamber 114. The upper shaft section 112 is journalled by a ball bearing assembly 116 abutting a flange 118 on the upper shaft section and held assembled by an internally threaded assembly cap 120 which compresses a sealing gasket 122, in wiping engagement with the upper section, between the shoulder 124 on the body 108 and the annular spacing element 126.

The inner shaft also extends through the sealing unit 36 as shown in FIG. 3 into which the outer shaft 44 extends. The sealing unit 36 includes a cylindrical stuffing box housing 128 that is provided with a threaded bore into which an inlet fitting 130 is inserted for connection to the supply conduit branch 30. The fitting 130 is sealed to the houing 128 by a packing seal 132 activated by a packing nut 134. An annular end wall 136 is threadedly mounted in the top of the housing 128 and threadedly receives an inner insert 138 axially abutting a radially inner sealing gasket 140 to prevent leakage about the inner shaft 46. A stuffing box packing 142 in wiping engagement with the inner shaft 46 is compressed or activated by a packing nut 144 threadedly received by the insert section 138 to complete the sealing about the inner shaft. The packing 142 is in axial abutment with the upper end of a shaft extension 146 which encircles the inner shaft above the upper end of the outer shaft 44 and has a portion 148 secured to the upper end of the inner wall 152 of the outer shaft. A cross-sectionally channel-shaped, flexible seat 150 surrounds the extension 146 within the housing 128 in wiping engagement with the upper end of the outer shaft 44 and an inner tubular wall 152 of the outer shaft to which the lower section 148 of the extension 146 is secured. The gasket 150 in response to pressure engages the end wall 136 and thereby effectively seals vertical passages 154 formed between the solid annular walls of outer shaft 44 including the inner tubular member. The flow conducting passage 154 are in fluid communication with the conduit section 30 through an annular receiving chamber 156 enclosed by the gasket 150. The inner tubular member 152 of the outer shaft is concentrically spaced from the outer wall by interconnecting spokes 158 as more clearly seen in FIG. 4. The lower end of the housing 128 is sealed about the outer wall of the outer shaft 44 by means of a packing 160 compressed by an annular channel member 162 when assembled by the internally threaded packing nut 164. The channel member 162 forms the outer race of a bearing assembly 166 through which the upper end of the outer shaft is journalled within the sealing unit 36.

An alternate form of sealing unit 36' is illustrated in FIG. 6 wherein the shaft extension 146 associated with the inner wall 152 of the outer shaft 44 is replaced by a stationary sleeve portion 146' projecting downwardly from the end wall 136' threadedly received in the top of unit housing 128' and axially overlapping the inner wall 152 of the outer shaft. A sealing gasket 140' is seated in a recess formed in the end wall 136' and abuts the insert 138' which in turn is formed with a recess seating the packing 142' compressed by the packing unit 144'. As in the case of sealing unit 36, the chamber 156' of unit 36' when pressurized by inflow of fluid to passage 154 expands the annular seal 150' into sealing engagement with the inner surface of housing 128' and the sleeve portion 146' to prevent leakage from the outer shaft. Leakage along the inner shaft on the other hand is prevented by sealing gasekt 140' and packing 142'.

In the foregoing description, it will be apparent that treating medium such as compressed air is introduced through the hollow air passage of the inner shaft 46 to the lower rotor 68 which is hollow and therefore forms an air manifold from which the compressed air is discharged through the orifices in the cluster of studs 78. The treating medium or pressurized air on the other hand is supplied to the upper rotor 66 through the hollow walled outer shaft 44 enclosing the flow passages 154. A hollow wall-type of construction is utilized so that both the sealing units 34 and 36 may be located above the support platform 12 in order to avoid servicing of sealing units immersed within the material being treated. A simpler constructional arrangement may however provide a flow conducting passage for the upper rotor formed directly between the inner and outer shafts where high pressure leakage is not as critical so that a solid walled outer shaft may be utilized. This type of arrangement is shown in FIG. 5 wherein the apparatus is generally denoted by reference numeral 168.

As in the case of the apparatus 10 illustrated in FIG. 1, apparatus 168 includes a lower rotor 68' and an upper vaned rotor 66' to which the treating medium is supplied for discharge from the cluster studs 78' on the confronting faces 72' and 74'. The rotors are to be driven in opposite directions through a drive shaft assembly 32'. The drive shaft assembly associated with the apparatus 168, however, includes a solid walled outer shaft 44' enclosing an annular flow conducting passage 154' which communicates with the cluster studs 78' through outlet ports 170 adjacent the lower ends of the outer shaft within the body of the rotor 66'. The inner shaft 46' on the other hand encloses an inner passage 172 that is closed by the end wall 174 at the lower end of the inner shaft adjacent to which is formed outlet ports 176 in fluid communication with the hollow body of the lower rotor 68'. The annular passage 154' is closed at its lower submerged end within the body of the upper rotor 66' by a gasket 178 that is activated by the packing nut 180 threadedly received within a hub section 182 welded to the outer shaft 44'.

The inner shaft 46' is adapted tobe driven through the armature of a motor 16' as diagrammatically illustrated in FIG. 5 through which the inner shaft extends. The upper end of the inner shaft is journalled within a fixed stuffing box or sealing unit 34' of any suitable type enclosing a receiving chamber 114' in communication with a supply conduit 28'. The annular passage 154' enclosed by the outer shaft 44' on the other hand, communicates with another supply conduit branch 30' through the receiving chamber 156' enclosed by a stuffing box 36'' of any suitable type through which the inner shaft 46' extends. The outer shaft 44' may be driven by any suitable source of motive power through a driven gear 184 secured to the outer shaft adjacent to the stuffing box 36''.

From the foregoing description, many uses of the portable treating apparatus will come to mind. For example, the apparatus may be utilized on oxidation ponds and other such places which do not have sewage treatment plants. Such oxidation ponds should be agitated to avoid settling and also aerated. By means of the apparatus, such oxidation ponds could also be seeded in order to encourage algae growth. The apparatus of the present invention could also be utilized to inject a treating medium for homogeneous mixing of neutralizing acids, alkalis, oxygen, ozone, in connection with phenol wastes and other bodies of industrial wastes prior to dumping into rivers or lakes. Treatment of oil spillage or leakage into lakes, rivers, harbors and oceans may also be facilitated by the mobility of the apparatus of the present invention. Oil spillage may be treated, for example, by the apparatus utilizing detergents as the treating medium for emulsification purposes or by introducing finely divided plastic particles to attract the oil and causing it to sink to the bottom. Injection of bacteria, fertilizer and oxygen with the treating medium for initial bacterial growth may also be taken advantage of with the apparatus of the present invention for bacteria digestion of oil spillage.

Thus, the apparatus of the present invention may be mounted and installed as a mobile or portable unit in a variety of ways including, for example, floating thereof as a raft, anchoring at influent openings in ponds, and by anchoring or towing to mouths of streams or rivers and at overflow spillage locations associated with industrial installations. The apparatus may also be mounted in special wells of boats or several of the units may be mounted in a floating arrangement between the support hulls of a catamaran type of boat for multi-stage treatment of material by connecting the effluent discharge pipe of one unit with the influent pipe of the following unit. In this usage of the apparatus, the outer wall enclosure would have to be imperforate and provided with an imperforate bottom whereby effluent is conducted from the top periphery of one unit into the center influent tube of a following unit into which it is introduced as the influent. In connection with the introduction of finely divided solids as a treating medium, activated charcoal may be utilized for sewage treatment together with a carrier gas such as air, oxygen or ozone.

In connection with the various aforementioned uses of the apparatus and the structural arrangement of the apparatus as hereinbefore described, several factors contribute to the efficient operation of the material treating method. A high centrifugal shear is induced by the lower rotor through the shearing studs aforementioned and internal shear created by the studded counter-rotating upper disperser rotor driven at a variable speed for controlled radial outflow. Injection of the treating medium whether it is gas, liquid or finely divided solids, through the stud cluster orifices, is of course one of the important aspects of the invention when injection is effected while the shear zone between the rotors is activated by counter-rotation of the rotors. The apparatus disclosed in the present invention is a particularly desirable improvement because of the type of mounting and mounting of power means and pressurized medium supply equipment on an accessible side of the supporting platform as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. Apparatus for treating a body of fluent material comprising a support, a vertically elongated drive shaft assembly rotatably mounted by the support and extending downwardly therefrom into the fluent material, rotor means connected to the shaft assembly vertically spaced below the support to form a shear zone within the fluent material, power means mounted only above the support and drivingly connected to the shaft assembly for imparting rotation to the rotor means to activate said shear zone, means connected to the shaft assembly above the support for injecting a treating medium into the shear zone through the shaft assembly and the rotor means, a downflow tube depending from the support enclosing the shaft assembly above the rotor means, and an aerating blade connected to the shaft assembly partially immersed within the fluent material and baffle means fixed to the support above the fluent material in operative relation to the blade.

2. The combination of claim 1 wherein said support is a flotation device carrying the power means and the medium injecting means above the surface of the fluent material.

3. The combination of claim 1 wherein said rotor means comprises an upper flow dispersing member at most diametrically equal to the imperforate tube and a lower flow directing member diametrically larger than the imperforate tube, said members having confronting faces between which the shear zone is formed, and material shearing projections on said faces having outlet orifices through which said treating medium is discharged into the shear zone.

4. The combination of claim 3 including a flow dispersing rotor mounted on the shaft assembly within the imperforate tube.

5. The combination of claim 4 wherein said shaft assembly includes an inner shaft enclosing a first flow passage for the treating medium and an outer shaft enclosing a second flow passage for the treating medium.

6. The combination of claim 5 wherein said inner and outer shafts are respectively connected to the lower flow directing member and the upper flow dispersing member transmitting counter-rotational movement to said members.

7. The combination of claim 6 wherein said support is a flotation device carrying the power means and the medium injecting means above the surface of the fluent material.

8. The combination of claim 7 wherein said medium injecting means includes a source of gas under pressure, and pressure sealed means connecting said source to the inner and outer shafts for fluid communication with said first and second flow passages.

9. The combination of claim 8 wherein said outer shaft is formed by a hollow annular wall within which the second flow passage is formed.

10. Apparatus for treating a body of fluent material comprising a support, a vertically elongated drive shaft assembly rotatably mounted by the support and extending downwardly therefrom into the fluent material, rotor means connected to the shaft assembly vertically spaced below the support to form a shear zone within the fluent material, power means mounted only above the support and drivingly connected to the shaft assembly for imparting rotation to the rotor means to activate said shear zone, and means connected to the shaft assembly above the support for injecting a treating medium into the shear zone through the shaft assembly and the rotor means, said shaft assembly including inner and outer shafts driven relative to each other by the power means and respectively enclosing flow passages for the treating medium, said rotor means including a pair of impellers respectively connected to said inner and outer shafts and a sealing unit mounted on the inner shaft through which the treating medium is conducted from the injecting means into the flow passage enclosed by the outer shaft.

11. The combination of claim 10 wherein said sealing unit includes an outer housing enclosing one end of said outer shaft, a removable end wall mounted by the housing in axially spaced relation to said one end of the outer shaft, packing means mounted by the end wall about the inner shaft, and pressure responsive sealing means enclosed by the housing in abutment with the end wall for sealing a receiving chamber establishing fluid communication between the flow passage enclosed by the outer shaft and the injecting means.

12. The combination of claim 11 wherein the outer shaft includes inner and outer walls between which one of the flow passages is formed, the inner wall having an extension in wiping engagement with the pressure responsive sealing means.

13. The combination of claim 11 wherein the end wall is provided with a radially inner sleeve surrounding the inner shaft in overlapping relation to the outer shaft and in engagement with the pressure responsive sealing means.

14. Apparatus for treating a body of fluent material comprising a support, a vertically elongated drive shaft assembly rotatably mounted by the support and extending downwardly therefrom into the fluent material, rotor means connected to the shaft assembly vertically spaced below the support to form a shear zone within the fluent material, power means mounted only above the support and drivingly connected to the shaft assembly for imparting rotation to the rotor means to activate said shear zone, means connected to the shaft assembly above the support for injecting a treating medium into the shear zone through the shaft assembly and the rotor means, and a downflow tube depending from the support enclosing the shaft assembly above the rotor means, said rotor means comprising an upper flow dispersing member at most diametrically equal to the downflow tube and a lower flow directing member diametrically larger than the downflow tube, said members having confronting faces between which the shear zone is formed, and material shearing projections on said faces having outlet orifices through which said treating medium is discharged into the shear zone.

15. The combination of claim 14 wherein said inner and outer shafts are respectively connected to the lower flow directing member and the upper flow dispersing member transmitting counter-rotational movement to said members.

* * * * *